Dec. 31, 1935.  O. C. HOLLOPETER  2,026,344
BREAKER ARM
Filed March 2, 1933
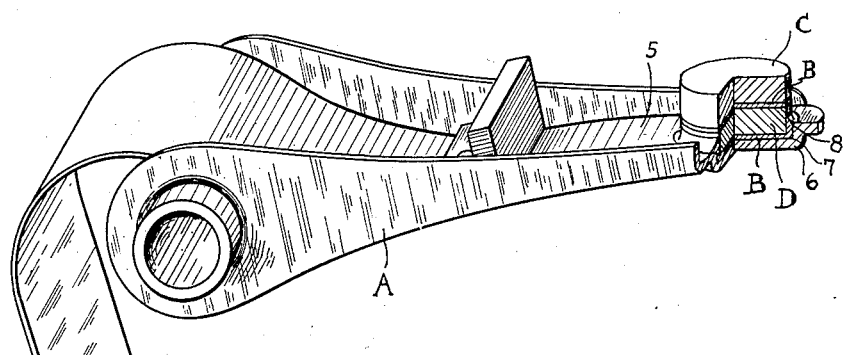
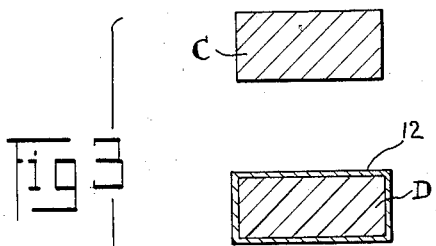
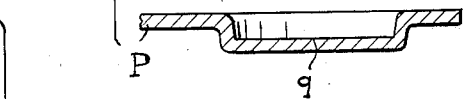
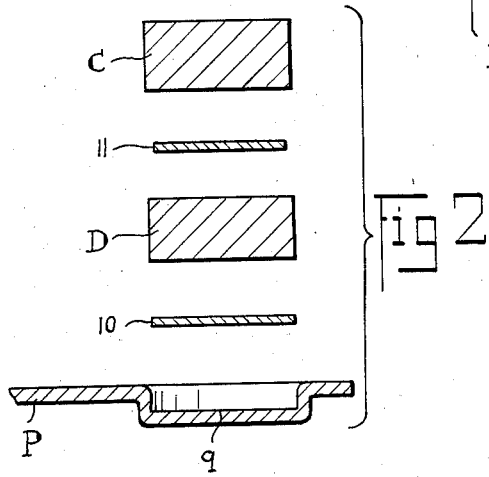
Orville C Hollopeter
INVENTOR.
BY Rudolf Wildermann
ATTORNEYS.

Patented Dec. 31, 1935

2,026,344

UNITED STATES PATENT OFFICE 2,026,344

BREAKER ARM

Orville C. Hollopeter, Englewood, N. J.

Application March 2, 1933, Serial No. 659,288

1 Claim. (Cl. 200—166)

This invention relates to contacts and breaker arms, as for instance used for automotive ignition; more particularly it relates to means for and the method of mounting a contact tip,— made of tungsten, platinum or the like,—upon a supporting plate.

Contacts provided with such tips are used in pairs, one contact being movably or vibratingly disposed whereas the second one is adjustably mounted on a stationary support in alignment with the former.

This invention relates primarily to the first kind of contacts, but in certain instances this invention may also be applied to the latter contact as well understood by those acquainted with this art. The former type of contact, the first mentioned of said pair, is ordinarily a rivet, point or stud, tipped in the manner described, and is riveted to a backing, a plate in the form of a breaker arm for instance.

In connection with such rivets, studs or points, as well as in connection with contact screws, wherever a contact tip is brazed onto a backing, it is a general custom to provide a platform or table of substantially the same diameter as the contact tip. This facilitates the "welding", i. e. the brazing of the tip onto the backing, because the contact tip readily centers itself upon a table or platform of like diameter during the brazing operation, due to a phenomenon commonly termed "capillary alignment". When the brazing material interposed between the tip and the table becomes fluid, cohesion of the parts involved and the adhesion and surface tension of the liquid brazing material effect a settling of the tip on the table in substantially central alignment.

Instead of assembling a contact tipped rivet to a breaker arm, it has been suggested to strike up a part of a plate or a breaker arm where the contact tip is to be applied thereto, so that a table or platform is formed, and so that the contact tip "capillarily" centralizes itself upon the said struck up table or platform. The industry has however found it difficult to strike up a portion of a plate or breaker arm, the surface of which provides a well defined flat surface of substantially the diameter or contour of the tip to be applied thereto. As a matter of fact those acquainted with the operation of presses, or tool and die makers, find it impossible to strike up, in a single die operation, a table which has a well and sharply defined contour around its top surface, as required to bring about the said phenomenon of capillary alignment in brazing a contact tip onto it.

It has been the prime object of this invention to provide a method and means causing the alignment of a contact tip relative to a plate or backing during a brazing operation at a predetermined point as required for mechanical operating precision and for a smooth electrical performance. For this purpose I provide between backing and tip a spacing disc aside from the brazing material which is mechanically located upon the backing, the said disc being at one end substantially of the diameter of the contact tip, so that the contact tip is aligned upon the said disc by capillary action and the tip, disc and backing are predeterminedly alignedly brazed together during the "welding" operation.

A further object of this invention is to provide intermediate to the contact tip and the supporting plate or backing a spacing member brazed therebetween, the said spacing member comprising, in the form of a coating for instance, the material necessary for brazing the parts together. This simplifies the manufacturing operation. To those acquainted with this art it is well known that the placing of the brazing material between the contact tip and the backing to which it is to be "welded" is a delicate operation, because a limited, small amount of the brazing material is required; a copper disc,—only a few thousandths of an inch in thickness,—is customarily used. Comprising the said welding material in or on a spacing disc, which may readily be handled by tweezers or manually, facilitates the contact manufacture to a great extent.

These and other objects of this invention will be more thoroughly brought forth in and understood from the following description and the accompanying drawing, in which Fig. 1 shows a perspective view of a breaker arm, to which a contact tip has been applied in accordance with this invention. A quadrant sector of the tip and the parts upon which it is assembled has been sectioned away for purposes of illustration.

Figs. 2 and 3 illustrate exploded sectioned views of the parts assembled in and during the exercise of my invention.

Similar letters and numerals refer to like parts throughout the various views.

A breaker arm A, as exemplarily shown in Fig. 1, is well known to those acquainted with this art so that a general description thereof (apart from the sectioned part thereof) becomes unnecessary. In the old art a tungsten or a platinum point was riveted onto the base 5 of said arm, near the extreme end thereof, so that the tip of the contact point assumed, in relation to said arm, substantially the position of the contact tip C of the present invention. In the execution of my invention, the base 5 is depressed at 6 substantially to the diameter of the contact tip C, care being taken that the depression or recess has a well defined, substantially sharp inner bottom corner 7.

It may be mentioned that for the purpose of the exemplary illustrations of this invention and in order clearly to show the brazing material, the sections of said brazing material B have been greatly exaggerated in respect to relative thickness; therefore the spacing between the parts brazed together is also out of proportion and exceeds the spacing in an actual execution of this invention, as will be readily understood by those acquainted with this art.

The spacing disc D, which is interposed between the contact tip C and the breaker arm, and which is substantially of the diameter of the contact tip C, is therefore mechanically aligned upon the breaker arm within and by the inner bottom corner 7 of depression 6 and is brazed onto and into the said breaker arm in such mechanical alignment and the contact tip is capillarily aligned on top of the disc D by the brazing material B.

As it has been mentioned before it is hardly possible to prevent sharp corners struck up during a punch and die operation and therefore the upper corner 8 of the depression will be and may be round. The excess brazing material B which flows down from between the contact tip C and the disc D during the "welding" operation, fills the space or gap at the corner 8, or material for filling the said gap may be otherwise provided for as will be explained later.

The exploded view of Fig. 2 shows the parts to be assembled in one modification of my invention during the "welding" operation; the plate P, which serves as a backing, is depressed in the manner described before, the bottom 9 of the depression being flat and diametrically well defined, substantially corresponding to the diameter of the disc D.

For the "welding" operation, a disc 10 of brazing material is dropped into the plate P onto the depressed face 9, the disc D is dropped thereonto, a second disc 11 of brazing material is placed on the disc D, and the contact tip C is placed on the top thereof. These parts are fed in stacked formation through a "welding" furnace,—a furnace in which the parts are raised to brazing temperature in a reducing atmosphere,—they are brazed together and are withdrawn, offering in their assembled formation substantially the appearance of the sectioned part of Fig. 1.

In the exploded view of Fig. 3 I indicate that the depression in the plate P may be provided with slanted sides,—thus facilitating the die operation by which the depression is formed in the plate,—provided that the spacing disc D is mechanically aligned upon the plate, as it is done in this instance by the sharp outline of the bottom 9 of the depression.

In this modification the spacing disc is electroplated with the brazing material. The disc D is therefore shown to be coated with a layer 12 of the brazing material.

The plated disc D is deposited in the recess of the plate P, the contact tip C is placed on top thereof, and these stacked parts are brazed together under suitable heat.

It is understood by those acquainted with this art, that this invention is not limited to the instance where a contact is to be provided upon a plate, but that the advantages of convenience and of mechanical alignment by a plated disc may be applied elsewhere in the contact manufacture such a disc being a suitable medium for capillary alignment of the tip on any contact backing, the disc being a convenient carrier for the brazing material. The spacing disc furthermore provides a means for raising the contact tip to any desired height above the backing so that a clearance for working on the tip is provided for, which is highly desirable from the standpoint of reconditioning a contact tip, as well known to those acquainted with ignition practice. Since all the parts are brazed together, my invention offers a homogeneous assembly, which is of particular advantage for electric current conduction. Since all the brazing is brought about simultaneously in as convenient an operation as the old operation of merely brazing the contact tip onto the backing, the contact manufacturing process is in no manner encumbered, but an improved product is obtained.

What I claim is:

A contact comprising a backing and a contact tip spaced apart by a plated disc, said backing, tip and disc being brazed together by the plating of said disc.

ORVILLE C. HOLLOPETER.